April 28, 1936.  A. MARLAND  2,039,255
FLUID CONTAINER AND METHOD OF WELDING THE SAME
Filed May 21, 1935
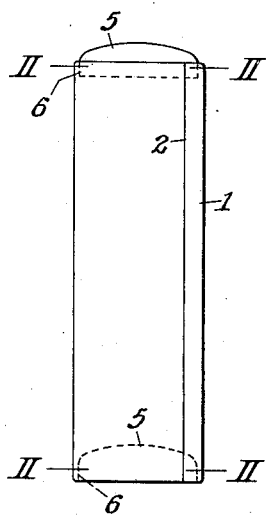
FIG. I.
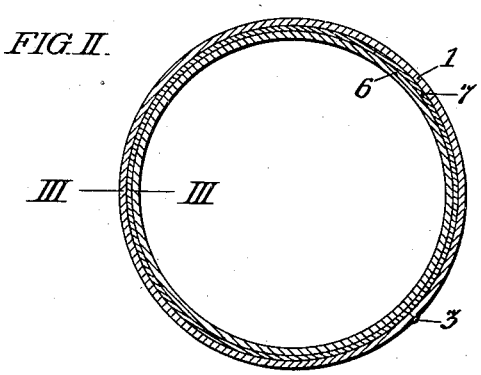
FIG. II.
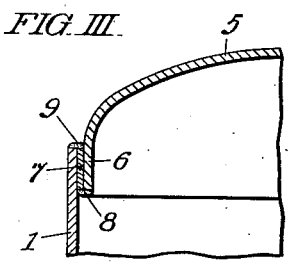
FIG. III.
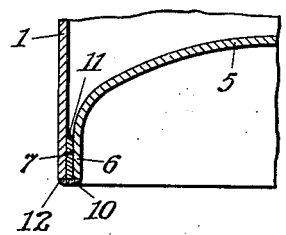
FIG. IV.
INVENTOR:
ARTHUR MARLAND,
BY
Attorney Patented Apr. 28, 1936

2,039,255

UNITED STATES PATENT OFFICE 2,039,255

FLUID CONTAINER AND METHOD OF WELDING THE SAME

Arthur Marland, Norristown, Pa., assignor to John Wood Manufacturing Company, Inc., Conshohocken, Pa., a corporation of Delaware Application May 21, 1935, Serial No. 22,515

3 Claims. (Cl. 220—67)

This invention may be employed with particular advantage in the manufacture of metal containers for fluid under pressure, particularly what are known to the trade as "range boilers", which are tanks including a cylindrical shell having circular heads at the respectively opposite ends thereof. Ordinarily, the cylindrical shells are connected with circumferential flanges on the respective heads solely by welded joints which form fillets at the extreme ends of said shell, the inner edges of said flanges being free from said shells, and such joints are frequently cracked by the repeated contraction and expansion of the shell with respect to the heads consequent upon the use of such containers for hot water at varying temperatures. Therefore, the principal object and effect of my invention is to make double and durable fluid tight joints, all of the flange weld type, between such container shells and the heads thereof, with the additional advantage that welds may be made in accordance with my invention in less time and consequently at less cost than said ordinary welds. However, I do not desire to limit my invention to such specific construction as it may be utilized in the manufacture of any structure wherein two primarily separate bodies of metal should be connected by a joint which will remain permanently tight.

An essential feature of my invention is that two metal bodies primarily separate and in spaced relation have interposed between them a third body for coupling them, such coupling being welded at one edge to one of said spaced bodies and at the other edge to the other of said spaced bodies. In the embodiment of my invention in a container such as above contemplated, the coupling is a strip of metal extending between and in parallel relation with both of the bodies which it is to couple. However, such parallel relation is not essential in some embodiments of my invention. In such containers as above contemplated the shell and heads may be formed of any suitable metal, but are ordinarily formed of ferric metal, and I prefer to form the couplings between them of an alloy having a fusing point lower than such ferric metal and which is principally copper; preferably 97% copper, 2% silicon, and 1% manganese. However, I do not desire to limit myself to coupling metal of that specific composition. The essential feature of said coupling metal is that it shall contain approximately 2% of silicon. The addition of manganese thereto is merely to increase the stiffness of the alloy. 1% of manganese will render the specific alloy aforesaid as stiff as the ferric metal which it may be used to connect.

My invention includes the various novel features of construction and method of operation hereinafter more definitely specified.

In said drawing, Fig. 1 is an elevation of a fluid container of the cylindrical type aforesaid.

Fig. II is a cross sectional view of said container taken on either of the lines II, II in Fig. I.

Fig. III is a fragmentary vertical radial section of the upper end of said container, taken on the line III, III in Fig. II.

Fig. IV is a fragmentary vertical radial section of the lower end of said container taken on the line III, III in Fig. II.

In said figures, the cylindrical shell 1 is conveniently formed of a primarily flat sheet of ferric metal connected at the junction of its edges brought together on the line 2 extending parallel with the axis of the cylinder, such joint being conveniently formed as indicated at 3 in Fig. II, by a welding operation. The opposite end heads 5 are conveniently formed alike from primarily flat pieces of sheet ferric metal by pressing them to concavo convex form with a cylindrical flange 6. As indicated in Fig. II, the cylindrical shell 1 and head flange 6 are in such spaced relation as to permit the interposition between them of the coupling band 7 which, in the container illustrated, is a circular band conveniently formed of a strip of the alloy metal aforesaid having its opposite ends welded together.

As shown in Fig. III, the upper head indicated in Fig. I has the lower edge of its flange 6 welded at 8 to the circumferential coupling band 7 and the upper edge of the latter is welded at 9 to the upper edge of the cylindrical shell 1. In assembling those parts in that relation, I find it convenient to first force the band 7 over the outside of the flange 6 and weld the adjoining edges thereof at 8 before inserting that head 5 in the shell 1.

As shown in Fig. IV, the lower head 5 indicated in Fig. I has the lower edge of its flange 6 welded at 10 to the circumferential coupling band 7 and the upper edge of that band is welded to the inner cylindrical surface of the shell 1, as indicated at 11. I also find it convenient to weld the lower edge of said shell 1 to the lower edge of said coupling band 7, as indicated at 12 in Fig. IV. In assembling those parts in that relation, I find it convenient to first force the lower band 7 within the lower end of the shell 1 and weld the upper edge of said band to said shell, as indicated at 11, before inserting said lower head as in Fig. IV.

It may be observed that in both assemblies shown respectively in Figs. III and IV, the coupling 7 is welded at its respectively opposite edges to the respective bodies of metal which it is designed to integrally connect so that each joint beween the shell and a head includes two circumferentially welded seams instead of one, as in the ordinary practice. Such double welding of said joints renders them doubly secure against leakage.

Of course, both ends of the shell 1 may be provided with heads 5 in outwardly convexed position, as indicated in Fig. III, or both ends of the container shell may be provided with heads in inwardly convexed position, as shown in Fig. IV. Moreover, my invention may be employed to connect parts formed of copper, with advantages equal to its employment to connect parts of ferric metal. Therefore, I do not desire to limit myself to the precise details of construction, arrangement, or method of procedure herein set forth, as it is obvious that various modifications may be made therein without departing from the essential features of my invention, as defined in the appended claims.

I claim:

1. In a fluid container, the combination with an outer cylindrical shell; of a circular head having a cylindrical flange fitted in said shell in concentric spaced relation therewith; an entirely cylindrical coupling band interposed between said shell and head in concentric relation with both; a welded seam connecting the edge of the flange on said head with one edge of said coupling; and a welded seam connecting the opposite edge of said coupling with said shell; the surfaces connected by said seams each extending in a plane at right angles to the axis of said container, wherein the shell and head are formed of ferric metal and the coupling band is formed of an alloy which is principally copper and having a fusing point lower than the metal of said shell and head, and containing approximately 2% of silicon.

2. In a fluid container, the combination with an outer cylindrical shell; of a circular head having a cylindrical flange fitted in said shell in concentric spaced relation therewith; an entirely cylindrical coupling band interposed between said shell and head in concentric relation with both; a welded seam connecting the edge of the flange on said head with one edge of said coupling; and a welded seam connecting the opposite edge of said coupling with said shell; the surfaces connected by said seams each extending in a plane at right angles to the axis of said container wherein the shell and head are formed of ferric metal and the coupling band is formed of an alloy which is principally copper but including approximately 2% of silicon and 1% manganese, and having a fusing point lower than the metal of said shell and head.

3. In a fluid container, the combination with an outer cylindrical shell; of a circular head having a cylindrical flange fitted in said shell in concentric spaced relation therewith; an entirely cylindrical coupling band interposed between said shell and head in concentric relation with both; a welded seam connecting the edge of the flange on said head with one edge of said coupling; and a welded seam connecting the opposite edge of said coupling with said shell; the surfaces connected by said seams each extending in a plane at right angles to the axis of said container wherein said coupling band is formed of copper alloyed with silicon, and said shell and closures are formed of unalloyed copper.

ARTHUR MARLAND.

CERTIFICATE OF CORRECTION.

Patent No. 2,039,255.　　　　　　　　　　　　　　　　　April 28, 1936.

ARTHUR MARLAND.

It is hereby certified that error appears in the printed specification of the above numbered patent requiring correction as follows: Page 1, first column, line 3, for "fluid" read fluids; page 2, first column, line 6, the word "two" should be underscored; same page, second column, line 20, claim 2, for "1%" read approximately 1% of; and line 35, claim 3, insert a semicolon before "wherein"; and that the said Letters Patent should be read with these corrections therein that the same may conform to the record of the case in the Patent Office.

Signed and sealed this 14th day of July, A. D. 1936.

Henry Van Arsdale
(Seal)　　　　　　　　　　　　　　　　　Acting Commissioner of Patents.